(12) United States Patent
Mahlbacher (10) Patent No.: US 8,156,049 B2
(45) Date of Patent: Apr. 10, 2012

(54) UNIVERSAL DRM SUPPORT FOR DEVICES

(75) Inventor: James C. Mahlbacher, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 10/980,798

(22) Filed: Nov. 4, 2004

(65) Prior Publication Data

US 2006/0095382 A1 May 4, 2006

(51) Int. Cl.
*G06F 21/00* (2006.01)
*H04L 9/16* (2006.01)

(52) U.S. Cl. ............ 705/57; 705/59; 705/901; 705/902; 705/904; 705/908; 705/911; 705/912

(58) Field of Classification Search .................. 705/57, 705/59, 901, 902, 904, 908, 911, 912
See application file for complete search history.

(56) References Cited

U.S. PATENT DOCUMENTS

| | | | |
|---|---|---|---|
| 5,592,611 A * | 1/1997 | Midgely et al. ................ 714/4 |
| 5,629,980 A * | 5/1997 | Stefik et al. ................ 705/54 |
| 5,825,884 A * | 10/1998 | Zdepski et al. ................ 705/78 |
| 5,982,891 A * | 11/1999 | Ginter et al. ................ 705/54 |
| 6,219,692 B1 * | 4/2001 | Stiles ................ 709/201 |
| 6,223,209 B1 * | 4/2001 | Watson ................ 709/201 |
| 6,298,373 B1 * | 10/2001 | Burns et al. ................ 709/203 |
| 6,370,580 B2 * | 4/2002 | Kriegsman ................ 709/226 |
| 6,697,944 B1 | 2/2004 | Jones et al. |
| 7,356,575 B1 * | 4/2008 | Shapiro ................ 709/220 |
| 2002/0023015 A1 | 2/2002 | Hughes et al. |
| 2002/0091584 A1 | 7/2002 | Clark et al. |
| 2002/0111912 A1 | 8/2002 | Hunter et al. |
| 2002/0141582 A1 * | 10/2002 | Kocher et al. ................ 380/201 |
| 2003/0016829 A1 | 1/2003 | Chu |

(Continued)

FOREIGN PATENT DOCUMENTS

WO WO2004/023717 3/2004

(Continued)

OTHER PUBLICATIONS

"Open Digital Rights Language (ODRL) Version 1.1", Sep. 19, 2002. W3C Note. Available at <http://www.w3.org/TR/2002/NOTE-odrl-20020919/>.*

(Continued)

*Primary Examiner* — Andrew J. Fischer
*Assistant Examiner* — Christopher C Johns
(74) *Attorney, Agent, or Firm* — Jon A. Gibbons; Fleit Gibbons Gutman Bongini & Bianco PL (57) ABSTRACT

Embodiments of the present invention allow a system or client device to process multiple Digital Rights Management (DRM) systems and formats using a universal DRM client. The universal DRM client can operate based on a universal license so that it may use the same DRM scheme or format used by the content provider. A DRM system may then build a universal license that includes information for gaining access to the content in the DRM package. In turn, a DRM package and the universal license may be provided to the universal client. Based on the information in the universal license, the client device can access the protected content even if it does not have the specific client program code for the DRM format used originally by the content provider.

7 Claims, 6 Drawing Sheets

U.S. PATENT DOCUMENTS

| | | | |
|---|---|---|---|
| 2003/0030750 A1 | 2/2003 | Hoarty et al. | |
| 2003/0048907 A1* | 3/2003 | Nakahara et al. | 380/277 |
| 2003/0078891 A1 | 4/2003 | Capitant | |
| 2003/0079133 A1 | 4/2003 | Breiter et al. | |
| 2003/0126086 A1* | 7/2003 | Safadi | 705/51 |
| 2003/0204723 A1* | 10/2003 | Narin et al. | 713/165 |
| 2003/0226012 A1 | 12/2003 | Asokan et al. | |
| 2003/0236978 A1 | 12/2003 | Evans et al. | |
| 2004/0010717 A1* | 1/2004 | Simec et al. | 713/201 |
| 2005/0065624 A1* | 3/2005 | Ben-Yaacov et al. | 700/94 |
| 2006/0153212 A1* | 7/2006 | Kawaguchi et al. | 370/401 |
| 2006/0187959 A1* | 8/2006 | Kawaguchi et al. | 370/468 |
| 2006/0242275 A1* | 10/2006 | Shapiro | 709/220 |
| 2007/0027814 A1* | 2/2007 | Tuoriniemi | 705/59 |
| 2008/0281943 A1* | 11/2008 | Shapiro | 709/218 |

FOREIGN PATENT DOCUMENTS

| | | |
|---|---|---|
| WO | WO2004/075092 | 9/2004 |

OTHER PUBLICATIONS

How Networks Work, Millennium Edition. Derfler, Frank et al. Que Publishing, Indianapolis, 2000. Front matter and chapter 17 included.*

* cited by examiner

UNIVERSAL DRM SUPPORT FOR DEVICES

FIELD

The present invention relates to distributing content. In particular, the present invention relates to distributing content that is protected by various digital rights management systems.

BACKGROUND

Digital Rights Management (DRM) systems protect content against unauthorized distribution. Electronic documents, video, music, and books are common types of content that may be protected by a DRM system. DRM systems may provide features, such as anti-copying features, time based expiration, and other limits on the use of the content.

There are currently a large number of DRM systems and associated formats, which are available to content providers and users. These DRM systems and formats often use one or more proprietary client applications, such as a media player, so that the user can download, play, or view the content.

Unfortunately, the known DRM systems use proprietary licenses and formats for packaging the content. In turn, these proprietary DRM packages require a corresponding proprietary DRM client that must be downloaded in order to render the content. As a result, a DRM client is often incompatible with the DRM licenses and packages from a different DRM system. Therefore, users must typically support a large number of DRM clients and software for proprietary DRM formats. This makes it difficult and inconvenient for a user to obtain and manage content protected by the large number of known DRM systems.

It would therefore be desirable to provide users the ability to download and use protected content based on a flexible DRM client that is capable of handling multiple DRM formats. It may also be desirable to provide protected content to a user in a fashion that is transparent to the user and the content provider.

SUMMARY

In accordance with some embodiments of the invention, a method of accessing protected content based on a digital rights format comprises: receiving a package of data that includes content protected based on the digital rights format; receiving a license that includes information for gaining access to the protected content and a location within the data of the content; and accessing the content based on the license.

In accordance with some embodiments of the invention, a method of transferring protected content that is protected based on a digital rights management format, comprises: receiving the content; packaging the content within a file that is protected based on the digital rights management format; sending the file to a client; determining a license that includes information for gaining access to the content and a location of the content within the file; and sending the license to the client.

In accordance with some embodiments of the invention, a device is configured to access content protected by a digital rights management format. The device comprises a memory for storing a file that includes content protected by a digital rights management format, and a processor configured by a universal client to receive a license that includes information for gaining access to the content and a location of the content within the file, and to access the content based on the license, wherein the universal client supports a plurality of digital rights management formats.

In accordance with some embodiments of the invention, a system is configured to distribute content that is protected by a digital rights management format and grant a license to the content. The digital rights management format specifies a proprietary format for the license. The system can also use a universal format that is compatible with a plurality of digital rights management formats for the license. The system comprises a first server and a second server. The first server is configured to package the content based on the digital rights management format, determine rights that are to be granted to the content, and distribute the content to a client. The second server is configured to receive from the first server information indicating the rights to be granted to the content, identify at least one characteristic of the client, select either the proprietary format or the universal format for the license based on the identified characteristic of the client, determine the license to the content based on the rights to be granted and the selected format, and distribute the license to the client.

In accordance with some embodiments of the invention, a method is provided for forming a license to content protected by a digital rights management system. Information indicating rights to be granted to the content is received. At least one characteristic of a destination of the content is identified. Either a proprietary format for the license that is used by the digital rights management system or a universal format for the license that is compatible with a plurality of digital rights management systems is selected based on the at least one characteristic of the destination of the content. The license is then formed based on the rights to be granted and the selected format.

In accordance with some embodiments of the invention, a license server configured to distribute a license to content protected by a digital rights management system. The license server comprises an interface and at least one processor. The interface is configured to receive from the digital rights management system information indicating rights to be granted to the content and configured to distribute the license to a client of the digital rights management system. The at least one processor is configured by program code to identify at least one characteristic of client, select either a proprietary format for the license that is used by the digital rights management system or a universal format for the license that is compatible with a plurality of digital rights management systems based on the at least one characteristic of the client, and form the license based on the rights to be granted and the selected format Additional features and embodiments of the invention will be set forth in part in the description which follows, and in part will be obvious from the description, or may be learned by practice of the invention. It is to be understood that both the foregoing general description and the following detailed description are exemplary and explanatory only and are not restrictive of the embodiments of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Embodiments of the present invention allow a system or client device to process content protected by multiple DRM systems and formats using a universal client. The universal DRM client can operate based on a universal license so that it may use the same DRM scheme or format used by the content provider. For example, in some embodiments, a content provider may encode, encrypt, and format content into a DRM package. A DRM system may also build a universal license that includes information for gaining access to the content in the DRM package. The DRM package and universal license may then be provided to the universal client. Based on the information in the universal license, the client device can access the protected content even if it does not have the specific proprietary DRM client for the DRM format used originally by the content provider. Accordingly, the embodiments described below have a flexible architecture that avoids being tied to one particular type of DRM format.

Reference will now be made in detail to the exemplary embodiments of the invention, examples of which are illustrated in the accompanying drawings. Wherever possible, the same reference numbers will be used throughout the drawings to refer to the same or like parts.

Figure 1:
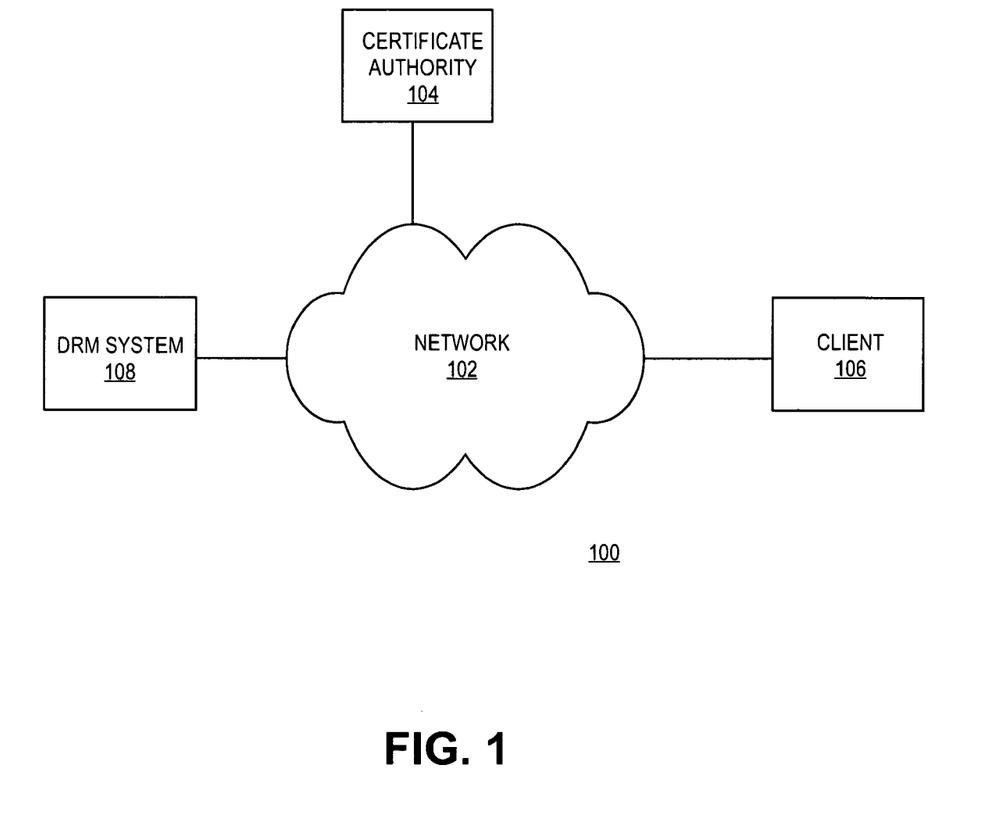
FIG. 1 illustrates an exemplary system that is consistent with embodiments of the present invention.

FIG. 1 illustrates an exemplary system 100 that is consistent with embodiments of the present invention. For ease of illustration, FIG. 1 only depicts a single DRM system, client, etc. However, one skilled in the art will recognize that system 100 can include any number of components.

As shown, system 100 may comprise a network 102, a certificate authority 104, a client 106, and a DRM system 108. These components may be coupled together across network 100 based on well known types of network connections, such as wireline or wireless connections, and may use any suitable network interface or adapter.

In general, the described embodiments can be implemented using well known general purpose or special purpose computing systems. Such well known computing systems include, but are not limited to, personal computers, server computers, thin clients, thick clients, hand-held devices, personal digital assistants (PDA), laptop computers, multiprocessor systems, microprocessor-based systems, set-top boxes, programmable consumer electronics, and the like. The components of system 100 will now be further described.

Network 102 provides a communication infrastructure that allows the other components of system 100 to communicate with each other. Network 102 can be implemented using well known types of networks, such as local area networks, wide area networks, and the Internet.

Certificate authority 104 serves as a trusted entity that assists in verifying or authenticating the identity of the other components of system 100, such as client 106 or DRM system 108. For example, certificate authority 104 may interface with one or more financial institutions, such as a credit card company or bank that provides information to confirm the identity of client 106. In some embodiments, certificate authority 104 may issue digital certificates that can be used to create digital signatures based on public-private key pairs. The key pairs allow the other components of system 100 to verify the identities with which they are exchanging data based on their assigned certificates.

In some embodiments, certificate authority 104 manages encryption/decryption keys that are used by the various components of system 100. The keys may be session-based keys to avoid having keys embedded in the various components of system 100. Certificate authority 104 may also support the public key encryption algorithm to allow for authentication and to setup the session keys between DRM system 108 and client 106. Certificate authority 104 may also periodically re-authenticate and renegotiate its key pairs, for example, to help maximize the security of the system 100.

Certificate authority 104 can be implemented using well known components of hardware and software. For example, certificate authority 104 can be implemented using a general purpose or special purpose computing system. These well known computing systems include, but are not limited to, personal computers, server computers, multiprocessor systems, microprocessor-based systems, and mainframe computers.

Client 106 provides a platform that allows a user (not shown) to request and render content from DRM system 108. As noted above, client 106 can be implemented using well known components of hardware and software. For example, client 106 can be implemented on any number of devices including a personal computer, PDA, mobile phone, and the like. Accordingly, client 106 can include a variety of memory or storage in the form of volatile, such as random access memory (RAM), and/or non-volatile memory, such as read only memory (ROM). Client 106 may further include other removable/non-removable, volatile/non-volatile computer storage media. Client 106 is also described with reference to FIG. 3.

DRM system 108 provides a platform that allows a content provider to deliver content, such as songs, video, documents, and other digital media over network 102 in a secure and protected fashion. In some embodiments, DRM system 108 can encrypt, encode, and format the content into a DRM package. For example, an encrypted form of the content may be stored in one or more contiguous portions of the DRM package. The DRM package can also include other information from the DRM system 108, such as streaming information, to assist in rendering the content and a location where a license can be obtained. The DRM package can be configured based on known formats, such as Windows Media Audio Format (WMA), Windows Media Video Format (WMV), Advanced Audio Coding (AAC), Moving Pictures Expert Group (MPEG), and the like.

DRM system 108 may also grant (or provide) one or more licenses that allow client 106 to open the DRM package and render the protected content. A license can specify several rules that govern the content including: how many times the content can be played; a time based expiration; what devices the content can be downloaded or played; whether the content can be copied or saved to another medium; and what security level is required to play the content. One skilled in the art will recognize that other types of rules and control policies may be embodied within the licenses from DRM system 108.

The licenses from DRM system 108 can be delivered in a variety of fashions and at different times. For example, DRM system 108 may deliver a license even before client 106 has requested or downloaded the content. Alternatively, DRM system 108 may deliver a license after client 106 has downloaded the content or when client 106 has attempted to access the DRM package for the first time. DRM system 108 can deliver the license with or without the knowledge of client 106. A further description of DRM system 108 will now be provided with reference to FIG. 2.

Figure 2:
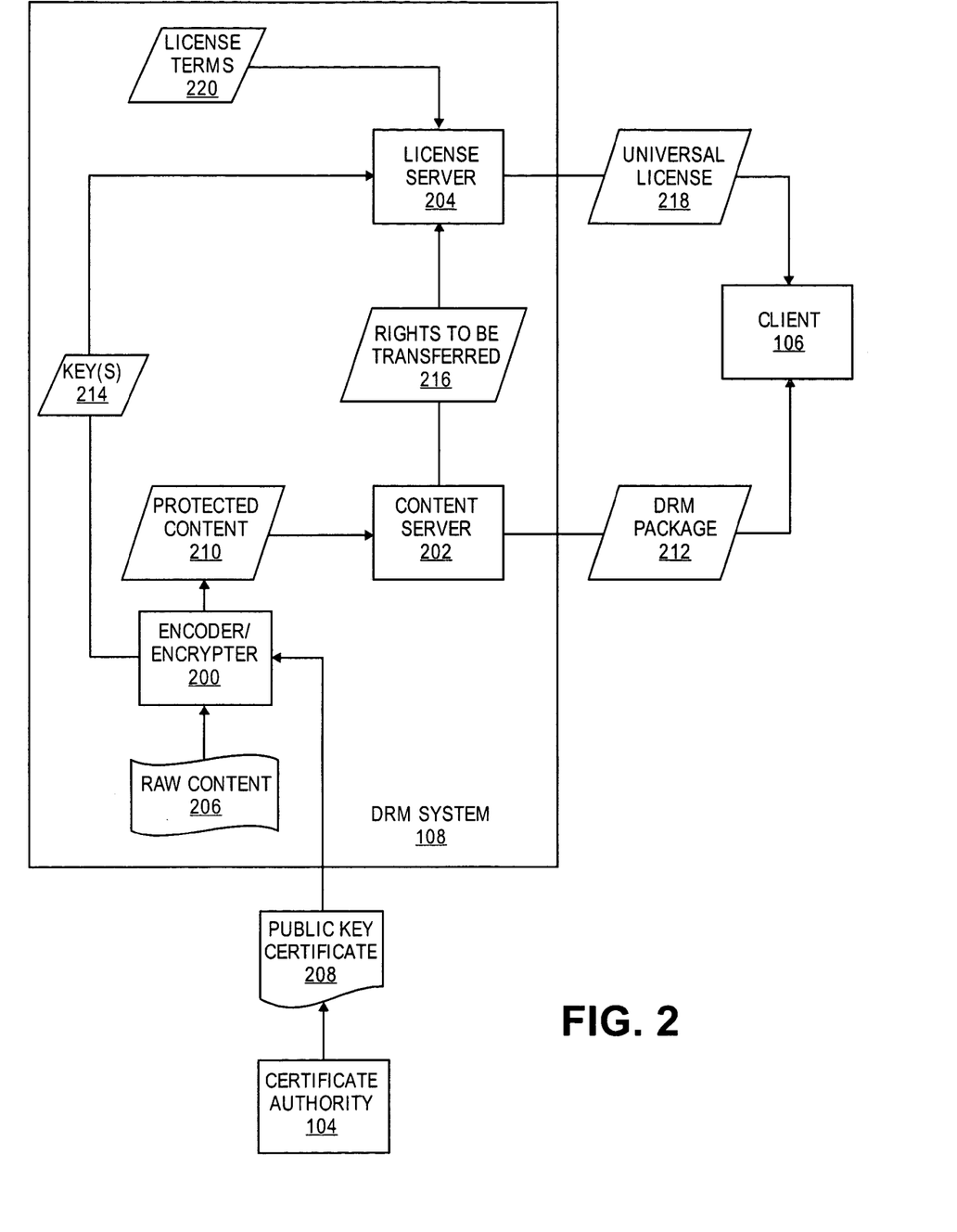
FIG. 2 illustrates a conceptual block diagram of an exemplary DRM system that is consistent with embodiments of the present invention.

FIG. 2 illustrates a conceptual block diagram of one embodiment of DRM system 108 that is consistent with embodiments of the present invention. As shown, DRM system 108 may include an encoder/encrypter 200, a content server 202, and a license server 204. These components and their general operation will now be further described.

Encoder/encrypter 200 receives content 206, and packages it, for example, by encoding and encrypting content 206. For example, encoder/encrypter 200 may encode and encrypt content 206 according to well known DRM formats, such as WMA, WMV, and the like. In addition, in some embodiments, encoder/encrypter 200 may digitally sign the content, for example, using a public key for client 106 received in public key certificate 208 from certificate authority 104. Encoder/encrypter 200 may then pass a protected content file 210 to content server 202. In addition, encoder/encrypter 200 may pass key data 214 to licenser server 204. Encoder/encrypter 200 may be implemented using well known components of hardware, software, or firmware. For example, encoder/encrypter 200 may be implemented as software or program code within content server 202.

However, one skilled in the art will recognize that encoder/encrypter 200 may be implemented as a separate device or server that is coupled to DRM system 108. For example, encoder/encrypter 200 may be managed or controlled by a third party, such as publisher, web site, etc.

Content server 202 provides a gateway or interface for distributing the protected content, such as protected content file 210, to client 106. For example, content server 202 can deliver protected content file 210 through network 102 in the form of DRM package 212. DRM package 212 can be formatted using any well known standard format, such as MPEG, WMA, WMV, and the like. Alternatively, content server 202 may provide DRM package 212 in other forms, such as a file transfer, or download. Furthermore, content server 202 may store DRM package 212 onto a CD-ROM, which is then delivered to client 106 separately. In addition, content server 202 may pass to license server 204 rights information 216, which indicates the rights to be transferred to client 106.

Content server 202 can be implemented using well known hardware and software. For example, in some embodiments, content server 202 can be implemented as a website on network 102. An exemplary structure for content server 202 is described with reference to FIG. 2A.

License server 204 generates a universal license 218 for accessing DRM package 212. Universal license 218 specifies parameters that control the access to the content in DRM package 212, such as who can use the content and how it is to be used. In accordance with the principles of the present invention, license server 204 may include various types of information in universal license 218 to support virtually any DRM format. For example, in some embodiments, license server 204 may build universal license 218 to include: an offset that indicates a location of the content within DRM package 210; a length that indicates the length of the content within DRM package 210; an encrypted cipher key, such as a RSA encrypted key; information that indicates a cipher type; information that indicates the encoding used by content server 202; a transaction identifier to authenticate the return of unused rights; information that indicates the rights to be transferred; and an identifier, such as a serial number, of client 106. Of course, license server 204 may include other information into universal license 218 to ensure that client 106 can access DRM package 212 regardless of its native DRM format.

In some embodiments, license server 204 may select from a variety of formats to form or build a license. For example, in certain instances, license server 204 may build universal license 218, which is based on a universal format. A universal format can be any format that is compatible with a plurality of digital rights managements systems, formats, or clients. In particular, license server 204 may build universal license 218 based on key information 214 from encoder/encrypter 200 and rights information 216 from content server 202. License server 204 may also retrieve license terms 220 in order to build universal license 218. License server 204 may receive license terms 220 from the provider (not shown) of content 206 or a third party, or may retrieve license terms 220 from its storage.

Alternatively, license server 204 may select the standard or proprietary format that is compatible with the digital rights management system used originally to protect raw content 206. License server 204 may select between universal license 218 and a proprietary license based on a variety of scenarios, such as querying client 106, or based on information received from content server 202. For example, license server 204 may query client 106 and test for various characteristics of client 106, such as the presence of software that is capable of interpreting universal license 218 installed in client 106. Such protocols and messaging for this type of query (e.g., TCP/IP) are well known to those skilled in the art. In the event that client 106 does not have this type of software, then license server 204 may send a license that is in the proprietary format that is compatible with DRM package 212. Regardless of the format used by license server 204, content server 202 can continue to use the original DRM format for DRM package 212.

License server 204 can be implemented with well known components of hardware and software. In addition, license server 204 can include memory or storage that store license terms for DRM package 212. These license terms can be individually customized or may be based on one or more predefined sets of terms that are determined by the content provider. An exemplary structure for license server 204 is described with reference to FIG. 2A.

Figure 2A:
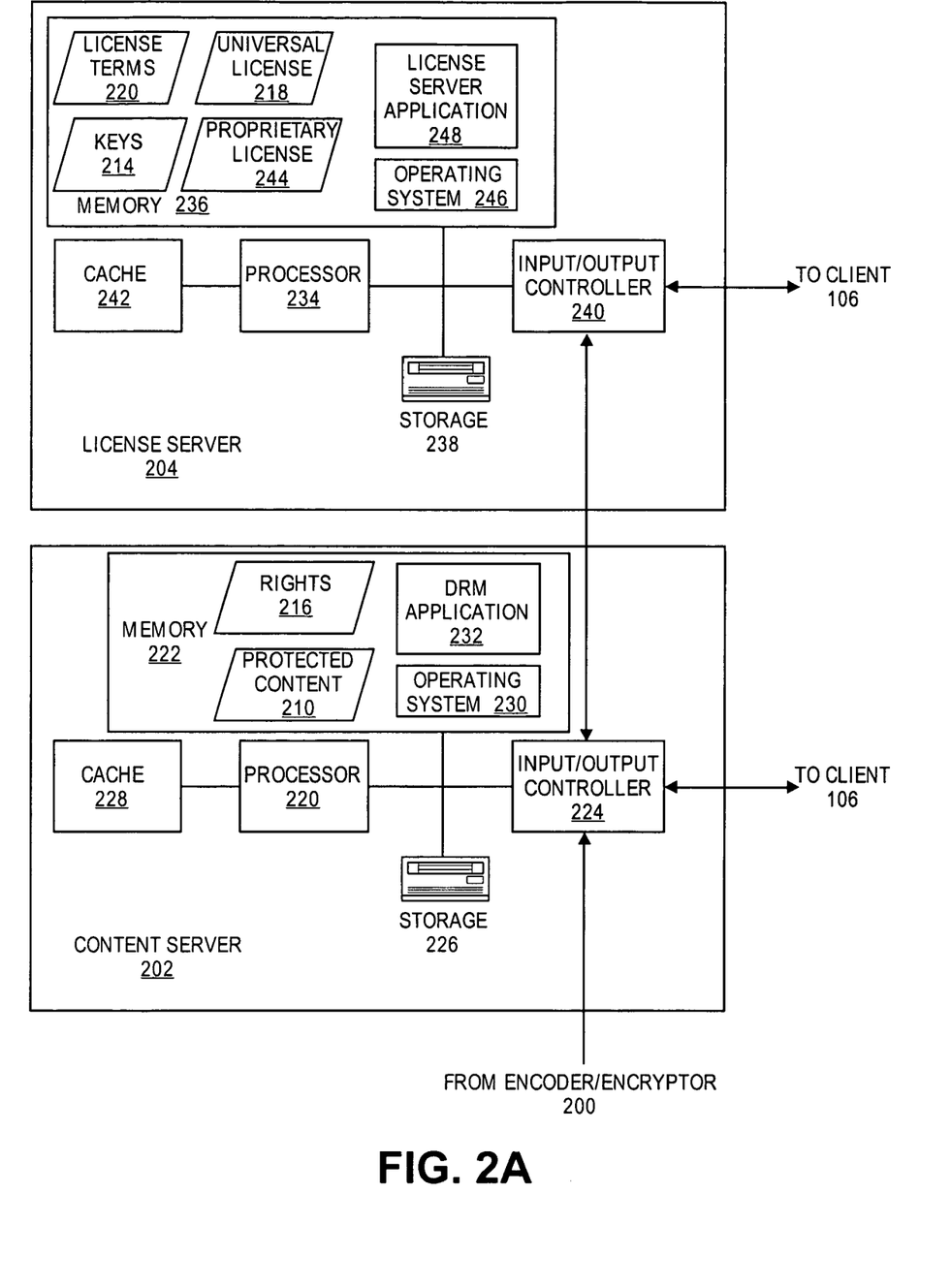
FIG. 2A illustrates exemplary components of the DRM system shown in FIG. 2.

FIG. 2A illustrates exemplary components of DRM system 108 shown in FIG. 2. Although FIG. 2A illustrates one example of the general structure for DRM system 108, the principles of the present invention are applicable to other types of processors and systems. That is, the present invention may be applied to any type of processor or system used as a DRM system. Examples of such devices include personal computers, one or more servers, mainframe computers, and their known equivalents. DRM system 108 may be implemented in a distributed computing environment, for example where content server 202 and license server 204 are linked through network 102 or some other type of network.

Referring now to FIG. 2A, exemplary components of content server 202 and license server 204 are shown. As shown, content server 202 may comprise a central processor 220, a main memory 222, an input/output controller 224, and a storage device 226. Content server 202 may also be provided with additional input/output devices, such as a network interface or modem (not shown). The various components of content server 202 may communicate through a system bus, networked environment, or similar architecture. These components of content server 202 will now be briefly described.

Processor 220 controls the operation of content server 202 based on program code, such as routines, programs, objects, components, data structures, etc. that may be stored in main memory 222 or storage device 226. Processor 220 may further include a cache memory 228 for storing frequently accessed information. Cache 228 may be an "on-chip" cache or external cache. Processor 220 may be implemented based on well known devices, such as those manufactured by IBM and the Intel Corporation.

Main memory 222 contains information that content server 202 uses in its operation. For example, as shown main memory 220 may include protected content 210, rights information 216, program code for an operating system 230, and a DRM application 232. Main memory 222 may include any of several types of memory including read only memory (ROM) and random access memory (RAM).

Operating system (OS) 230 is an integrated collection of routines that service the sequencing and processing of programs and applications executed by content server 202. OS 230 may provide many services for content server 202, such as resource allocation, scheduling, input/output control, and data management. OS 230 may be predominantly software, but may also comprise partial or complete hardware implementations and firmware. Well known examples of operating systems that are consistent with the principles of the present invention include Mac OS by Apple Computer, Open VMS, GNU/Linux, AIX by IBM, Java and Sun Solaris by Sun Microsystems, Windows by Microsoft Corporation, Windows NT, and Windows XP.

DRM application 232 may comprise the program code, objects, data structures, etc. that content server 202 uses in order to function as a server of content for DRM system 108. For example, DRM application 232 may include program code so that content server 202 may deliver DRM package 212 to client 106. In addition, DRM application 232 may include program code to allow client 106 to request DRM package 212 from content server 202. In some embodiments, DRM application 232 configures content server 202 to deliver DRM package 212 in the native or original format used by entity that authored or provided protected content 210 or raw content 206. DRM application 232 may be "loaded" (i.e., transferred from storage 226 into cache 228 or memory 222) for execution by content server 202. DRM application 232 may be written in a variety of programming languages, such as C, C++, or Java.

Input/output controller 224 provides an interface for content server 202 and the other components of DRM 108. For example, content server 202 may have one or more physical or virtual connections to network 102. As another example, content server 202 may be coupled to other devices, such as license server 204, encoder/encrypter 200 through input/output controller 224. Input/output controller 224 may be implemented using well known equipment and software, such as a network interface card or modem.

Storage device 226 provides a persistent storage location which content server 202 may read from and write to. For example, storage device 226 may store various files, such as DRM package 212, or protected content 210. Storage device 226 may be implemented using known devices. For example, storage device 226 may be implemented as a magnetic disk drive, an optical disk drive, or the like. One skilled in the art will recognize that storage device 226 can be implemented to accommodate other types of computer readable medium, such as magnetic cassettes, flash memory, and the like.

License server 204 may also comprise may comprise a central processor 234, a main memory 236, a storage device 238, and an input/output controller 240. License server 204 may also be provided with additional input/output devices, such as a network interface or modem (not shown). The various components of license server 204 may communicate through a system bus, networked environment, or similar architecture. These components of license server 204 will now be briefly described.

Processor 234 controls the operation of license server 204 based on program code, such as routines, programs, objects, components, data structures, etc. that may be stored in main memory 236 or storage device 238. Processor 234 may further include a cache memory 242 for storing frequently accessed information. Cache 242 may be an "on-chip" cache or external cache. Like processor 220 described above, processor 234 may be implemented based on well known devices, such as those manufactured by IBM and the Intel Corporation.

Main memory 236 contains information that license server 204 uses in its operation. For example, as shown main memory 236 may include protected key information 214, universal license 218, license terms 220, a proprietary license 244, an OS 246, and a license server application 248. Main memory 236 may include any of several types of memory including read only memory (ROM) and random access memory (RAM).

Proprietary license 244 is the standard or default license that is used by the native DRM system of DRM package 212. As described below, license server 204 may store or retrieve proprietary license 244 as an alternative to universal license 218.

Operating system (OS) 246 is an integrated collection of routines that service the sequencing and processing of programs and applications executed by content server 202. OS 246 may provide many services for content server 202, such as resource allocation, scheduling, input/output control, and data management. OS 246 may be predominantly software, but may also comprise partial or complete hardware implementations and firmware. Well known examples of operating systems that are consistent with the principles of the present invention include Mac OS by Apple Computer, Open VMS, GNU/Linux, AIX by IBM, Java and Sun Solaris by Sun Microsystems, Windows by Microsoft Corporation, Windows NT, and Windows XP.

License server application 248 may comprise the program code, objects, data structures, etc. that license server 204 uses in order to grant licenses to content protected in DRM package 212. License server application 248 may be "loaded" (i.e., transferred from storage 238 into cache 242 or memory 236) for execution by license server 204. For example, in some embodiments, license server application 248 includes program code, modules, data structures, etc. for forming a license to the content protected DRM application 212. That is, license server application 248 may include program code for retrieving rights information 216 from content server 202, license terms 220, and keys 214 in order to form a license. In addition, license server application 248 may include program code to determine one or more characteristics about the destination (e.g., client 106) of the content. For example, license server application 248 may test client 106 for the presence of software (e.g., a universal DRM software 302) that is capable of interpreting the formal of universal license 218. License server application 248 may then include program code that selects either a proprietary license 244 or universal license 218 based on testing client 106. License server application 248 then forms the license based on the rights indicated in rights information 216, license terms 220, and the selected format. Of course, license server application 248 may be written in a variety of programming languages, such as C, C++, or Java.

Referring now to the other components of license server 204, storage device 238 provides a persistent storage location which license server 204 may read from and write to. For example, storage device 238 may store various files, such as files for proprietary license 244 and universal license 218. Storage device 238 may be implemented using known devices. For example, storage device 238 may be implemented as a magnetic disk drive, an optical disk drive, or the like. One skilled in the art will recognize that storage device 238 can be implemented to accommodate other types of computer readable medium, such as magnetic cassettes, flash memory, and the like.

Input/output controller 240 provides an interface for license server 204 and the other components of DRM 108. For example, license server 204 may have one or more physical or virtual connections to network 102. License server 204 may also be coupled to other devices, such as content server 202 through input/output controller 240. Input/output controller 240 may be implemented using well known equipment and software, such as a network interface card or modem.

Figure 3:
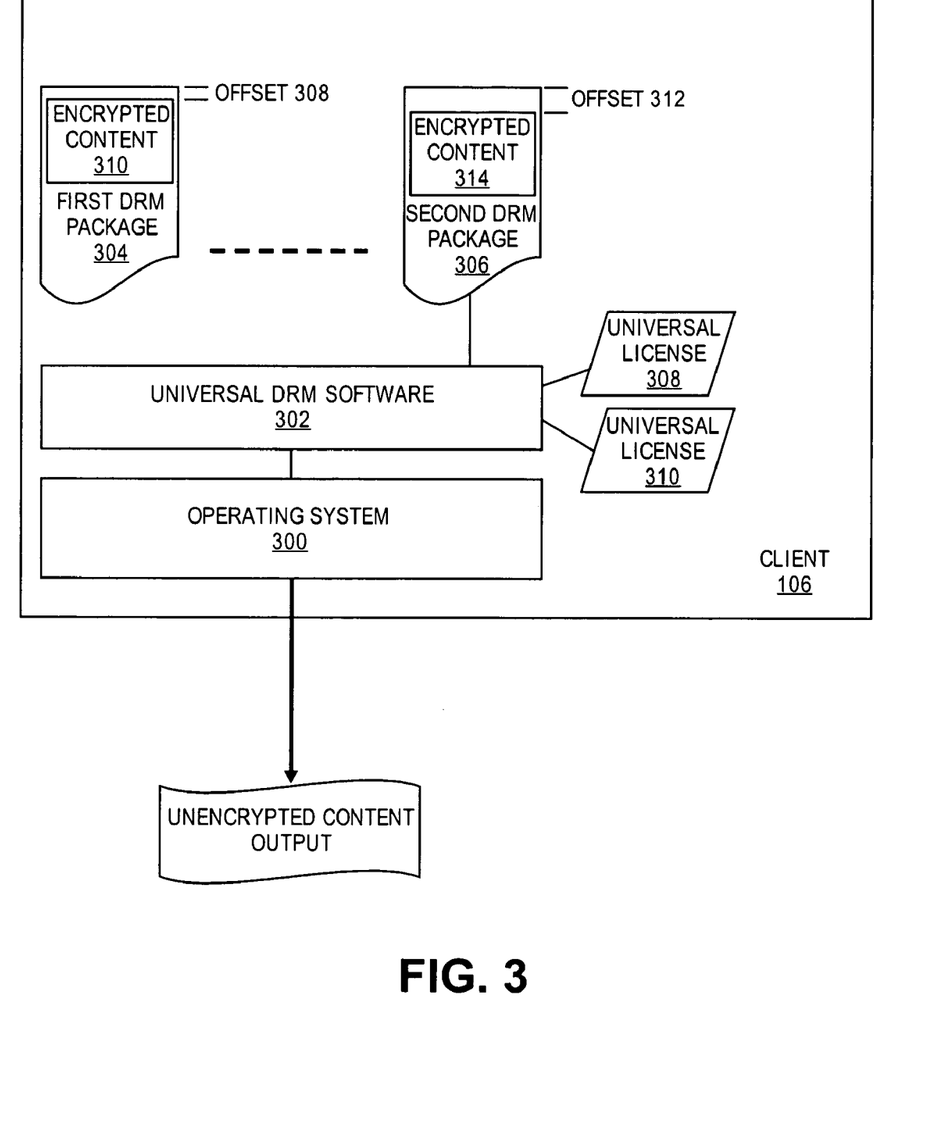
FIG. 3 illustrates a conceptual block diagram of an exemplary client that is consistent with embodiments of the present invention.

FIG. 3 illustrates a conceptual block diagram of one embodiment of client 106 that is consistent with embodiments of the present invention. As noted, client 106 can be implemented using well known components of hardware and software. For example, client 106 can include a number of program modules that are stored on a hard disk, ROM, or RAM. A user of client 106 may enter commands and information through well known input devices, such as a keyboard and mouse. Client 106 may also include various output devices, such as a monitor, speakers, and printer.

One feature of the described embodiments is that client 106 can flexibly process different types of DRM formats and can be employed in the context of many different types of devices and environments. For example, client 106 can be implemented to a wide variety of client devices and may even be implemented across multiple devices that are coupled together. Exemplary components of client 106 will now be further described.

As shown, client 106 may include an operating system 300, and universal DRM software 302. In general, these components of client 106 can operate together to receive encrypted data or content in packages from DRM system 108. Client 106 may use the information in a universal license to discover the format of the packages from DRM system 108. Alternatively, client 106 can be configured to determine the DRM format of these packages, and then access a license to unlock the content from the packages. These components may be implemented as software, firmware, or some combination of both, which is stored in the memory of client 106. The software components may be written in a variety of programming languages, such as C, C++, Java, etc.

Operating system (OS) 300 is an integrated collection of routines that service the sequencing and processing of programs and applications executed by client 106. OS 300 may provide many services for client 106, such as resource allocation, scheduling, input/output control, and data management. OS 200 may be predominantly software, but may also comprise partial or complete hardware implementations and firmware. Well known examples of operating systems that are consistent with the principles of the present invention include Mac OS by Apple Computer, Open VMS, GNU/Linux, AIX by IBM, Java and Sun Solaris by Sun Microsystems, Windows by Microsoft Corporation, Microsoft Windows CE, Windows NT, Windows 2000, and Windows XP.

Universal DRM software 302 coordinates the operation of client 106 for the access and rendering of the content in a DRM package, such as DRM package 212. One advantageous feature of this architecture is that universal DRM software 302 can be compatible with multiple types of DRM packages based on the information in universal license 218.

For example, as shown in FIG. 3, universal DRM software 302 may access DRM packages 304 and 306. In this example, DRM packages 304 and 306 have different formats. In particular, DRM package 304 may be formatted with an offset 312 to encrypted content 316. In contrast, DRM package 306 may be formatted with a different offset 314 to its encrypted content 318. These parameters may have been specified by the content's providers or by DRM system 108. However, universal DRM software 302 may use the information in universal licenses 308 and 310, respectively, to access the content in DRM packages 304 and 306 even though their formats are different. As noted, universal licenses, such as universal licenses 308 and 310, may be configured to include information that allows universal DRM software 302 to interpret both DRM packages 304 and 306. For example, universal licenses 308 and 310 may include information that indicates offsets 312 and 314 so that universal DRM software 302 can locate encrypted contents 316 and 318, respectively. Therefore, the universal licenses that are consistent with embodiments of the present invention can serve as a mapping to universal DRM software 302 across any DRM format in a manner that is transparent to client 106 and DRM system 108.

In addition, universal DRM software 302 can provide an interface for accessing or viewing content protected in the DRM packages. In some embodiments, universal DRM software 302 includes or is linked to a specialized viewer that is installed on client 106. Universal DRM software 302 may be used to temporarily decrypt the encrypted content and view/play it within a secure environment subject to the restrictions placed by the universal license, such as universal license 308 or 310. Universal DRM software 302 can be implemented as a program that displays, or facilitates the display of on-screen options, usually in the form of icons and menus in response to user commands. The accessing and playback of content provided by universal DRM software 302 can then be selected by the user through the operation of hardware, such as a mouse or keyboard (not shown).

Figure 3A:
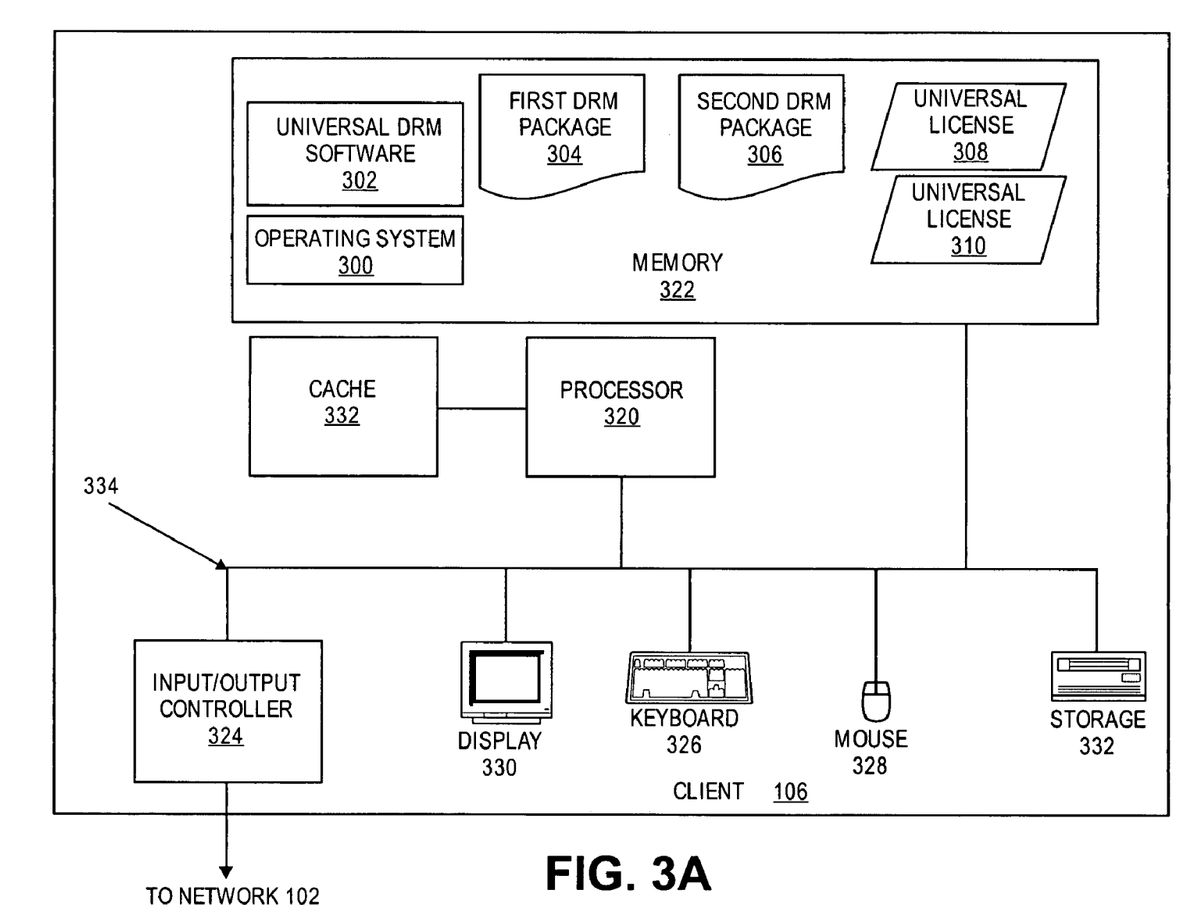
FIG. 3A illustrates an exemplary structure of the client shown in FIG. 3.

FIG. 3A illustrates an exemplary structure of client 106 shown in FIG. 3. As shown, client 106 may comprise may include a central processor 320, a main memory 322, an input/output controller 324, a keyboard 326, a pointing device 328 (e.g., mouse, or the like), a display 330, and a storage device 332. Processor 320 may further include a cache memory 334 for storing frequently accessed information. Cache 334 may be an "on-chip" cache or external cache. Client 106 may also be provided with additional input/output devices, such as a printer (not shown). The various components of client 106 communicate through a system bus 336 or similar architecture.

In the example shown in FIG. 3A, memory 322 contains information program code, objects, data structures, and the like to configure client 106 as a universal client. For example, as shown memory 322 may include the program code for OS 300 and universal DRM software 302. In addition, memory 322 may include the information and data structures for DRM packages 304 and 308, and universal licenses 308 and 310. Of course, one skilled in the art will recognize that this information may also have been read from or written to storage device 332.

FIG. 3A illustrates just one example of a general structure for client 106 as a computer system, the principles of the present invention are applicable to other types of processors and systems. That is, the present invention may be applied to any type of processor or system used as a client device. Examples of such devices include personal computers, servers, handheld devices, and their known equivalents. In addition, as shown, client 106 may be implemented in a networked environment, and thus, coupled to network 102 via input/output controller 324. Accordingly, client 106 may directly or indirectly communicate with other devices and systems, such as DRM system 108 and recipient 114.

Figure 4:
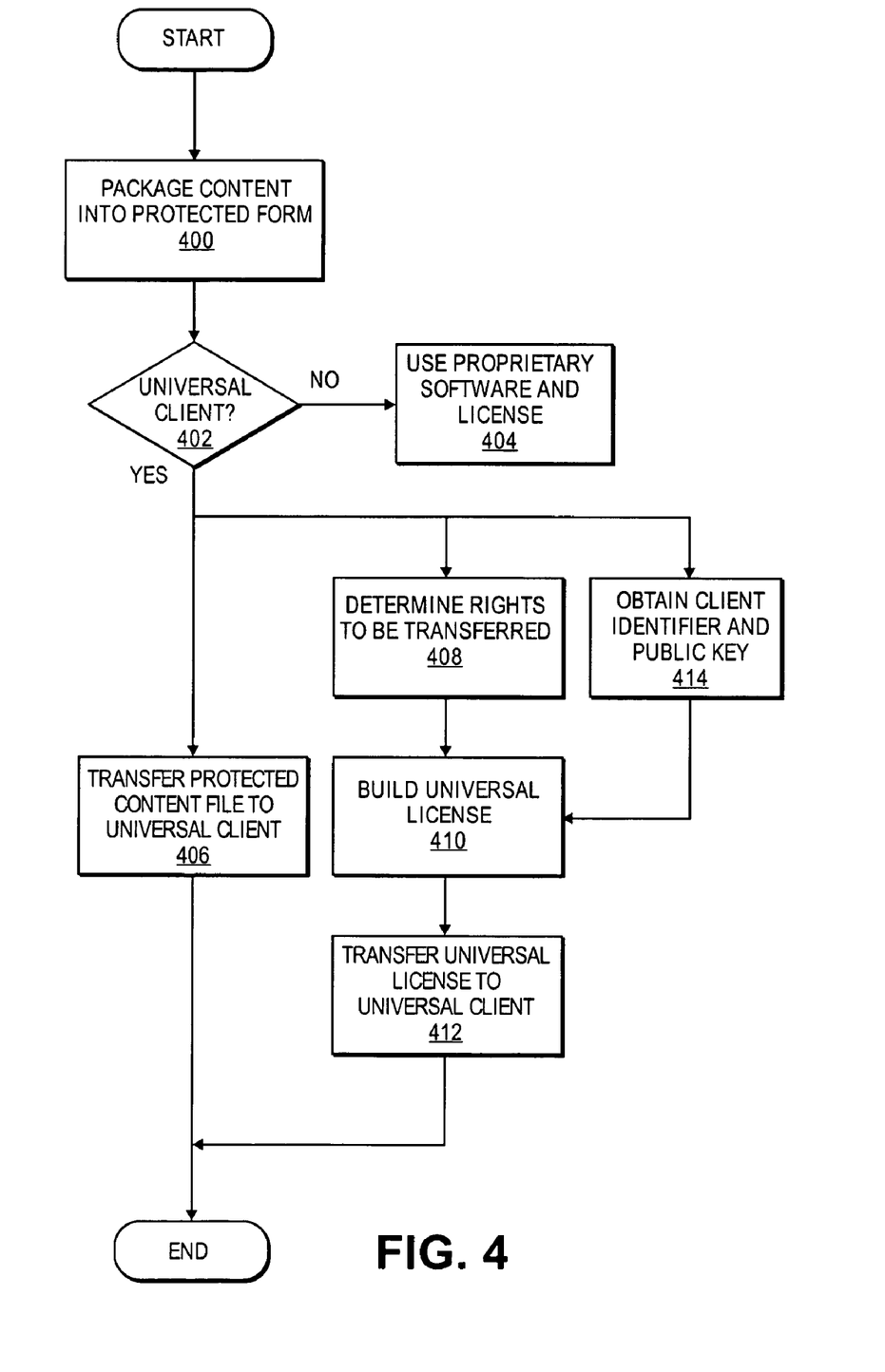
FIG. 4 illustrates an exemplary process flow for providing protected content that is consistent with embodiments of the present invention.

FIG. 4 illustrates an exemplary process flow for providing protected content that is consistent with embodiments of the present invention. In stage 400, the content is packaged into a protected form. For example, DRM system 108 may receive raw content from a content provider or some other third party. Encoder/encrypter 200 of DRM system 108 may then encrypt and sign the content into a protected format. In some embodiments, encoder/encrypter 200 may encrypt the content based on a set of session keys that are shared with client 106. Encoder/encrypter 200 then passes the protected content to content server 202.

In some embodiments, content server 202 may prepare and store the DRM package in a format that is used by the content's provider. Client 106 may then interface with content server 202 to request the appropriate DRM package. For example, client 106 may interface content server 202 through network 102 and have an account on content server 202. In addition, content server 202 and client 106 may collaborate on other procedures, such as pricing or billing, of the requested DRM package.

In stage 402, content server 202 determines whether client 106 is a universal client, e.g., a client that may contain software that is capable of interpreting universal license 218. For example, content server 202 may send one or more request messages to client 106 that checks for the presence of universal DRM software 302. Such protocols and techniques are well known to those skilled in the art. If client is a universal client, then processing flows to stages 406, 408, and 414. If client 106 is not a universal client, then processing flows to stage 404.

In stage 404, client 106 has been deemed a non-universal client. As a result, DRM system 108 will proceed based on the native procedures of the DRM scheme used by the content provider. For example, DRM system 108 may transmit to client 106 the proprietary license, such as proprietary license 244, required by the DRM scheme used by the content provider. Client 106 may then continue with rendering and accessing the content by using the proprietary client of the DRM system used by the content's provider or author.

However, if client 106 is found to be a universal client, then processing by DRM system 108 flows to branches that begin at stages 406, 408, and 414. Each of these processing branches will now be discussed in turn.

In stage 406, content server 202 proceeds with transmitting the DRM package to client 106. Of note, content server 202 may transmit the DRM package in the original format used by the content provider or author of the content. Therefore, the process illustrated in FIG. 4 remains transparent to the content provider or author of the content.

Meanwhile, in stage 408, license server 204 of DRM system 108 determines what rights are to be granted to client 106 and the user. License server 204 can receive this information from content server 202. In some embodiments, the information indicating the rights to be transferred may be expressed in well known languages, such as the Extensible Rights Markup Language (XrML). Processing then flows to stage 410.

In parallel to stage 408, in stage 414, DRM system 108 may obtain an identifier for client 106 and the public key for client 106. For example, DRM system 108 may query certificate authority 104 to obtain an identifier and the public key for client 106. In response, certificate authority 104 may issue a certificate for client 106 to DRM system 108. In some embodiments, this information in the certificate may then be passed to encoder/encrypter 200. Encoder/encrypter 200 may then digitally sign the content based on the public key. Encoder/encrypter 200 may also pass the public key and identifier to license server 204. Processing then flows to stage 410, as well.

In stage 410, license server 204 builds a universal license, such as universal license 218, for client 106. License server 204 may collect the license terms from content server 202, one or more sets of encryption keys, including the public key for client 106, from encoder/encrypter 200, and the rights to be transferred from content server 202. Based on this information, license server 204 may then form or build the universal license to include a variety of information. For example, the universal license may include an offset that indicates a location of the content within the DRM package; a length that indicates the length of the content within the DRM package; a RSA encrypted key; information that indicates a cipher type; information that indicates the encoding used by content server 202; a transaction identifier to authenticate the return of unused rights by client 106; information, such as XrML information, that indicates the rights to be transferred; and a serial number of client 106. License server 204 may also incorporate other information into the universal license. Once license server 204 has built the universal license, processing then flows to stage 412.

In stage 412, license server 204 transmits the universal license to client 106. License server 204 may transmit the universal license at any time. For example, license server 204 may transmit the universal license before even the DRM package is sent to client 106. In other instances, license server 204 may transmit the universal license at a separate time from when the DRM package is sent to client 106. For example, license server 204 may send the universal license when client 106 tries to access the DRM package, or after client 106 has completed a purchase transaction with content server 202. In some embodiments, the DRM package includes a locator, such as a Uniform Resource Locator (URL), so that client 106 can determine where to obtain the universal license. In other embodiments, license server 204 may provide the universal license to client 106 in a manner that is transparent to client 106.

Accordingly, client 106 may then view or play the content in the DRM package. For example, client 106 may invoke universal DRM software 302 to perform the temporary decryption and to provide a secure viewing environment for the content based on the information in the DRM package and the universal license. In some embodiments, universal DRM software 302 is configured to perform these tasks without exposing the decrypted content or the decryption keys to the user of client 106.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, at a digital rights management (DRM) system residing at a server, of transferring protected content, wherein the content is protected based on a DRM format, the computer-implemented method comprising:

performing with a computer processor the following:
packaging, by the DRM system residing at the server that is remote from a client, a content set within a file that is protected based on a given DRM format, wherein the given DRM format comprises a type of encoding and encrypting, and wherein the given DRM format is associated with a proprietary client application for rendering the content set;
identifying, by the DRM system, a set of rights to be granted to the client with respect to the content set;
determining, by the DRM system, that the client supports a DRM license format that is
  independent of the given DRM format used to package the content set, and
  independent of at least one DRM license format specific to the given DRM format and that is used to access the content set;
generating, by the DRM system, in response to the determining, a license in the DRM license format that is
  independent of the given DRM format used to package the content set, and
  independent of the at least one DRM license format specific to the given DRM format and that is used to access the content set, wherein the license includes information for allowing the client to gain access to the content set; and
transmitting, by the DRM system, the content set that has been packaged and the license to the client, wherein the information within the license is used by the client to render the content set even though the client fails to have a DRM client that is specific to the given DRM format used to package the content set.

2. The computer implemented method of claim 1, wherein the content set that has been packaged and the license are separate and distinct from each other.

3. A digital rights management (DRM) system for managing protected content, wherein the content is protected based on a DRM format, the DRM system comprising:

a first server comprising:
  a memory;
  a processor;
  an input-output controller; and
  a license generator programmed to:
    receive a set of information indicating a set of rights to be granted to a client destined to receive a file comprising a content set, wherein the file is protected based on a given DRM format with a set of rights granted to the client, the given DRM format comprising a type of encoding and encrypting, and wherein the given DRM format is associated with a proprietary client application for rendering the content set;
    determine that the client supports a DRM license format that is
      independent of the given DRM format used to package the content set, and
      independent of at least one DRM license format specific to the given DRM format and that is used to access the content set;
    generate, in response to the determining a license in the DRM license format that is
      independent of the given DRM format used to package the content set, and
      independent of the at least one DRM license format specific to the given DRM format and that is used to access the content set, wherein the license includes information for allowing the client to gain access to the content set; and
  wherein the first server is programmed to transmit the license to the client via the input-output controller, wherein the information within the license is used by the client to render the content set even though the client fails to have a DRM client that is specific to the given DRM format used to package the content set.

4. The DRM system of claim 3, wherein the content set that has been packaged and the license are separate and distinct from each other.

5. The DRM system of claim 3, further comprising
a second server comprising:
  a memory;
  a processor; and
  an encoder, wherein the encoder is programmed to:
    package the content set that is destined to be received by the client within the file that is protected based on the given DRM format;
    determine a set of rights to be granted to the client with respect to the content set; and
  wherein the second server is programmed to transmit the content set that has been packaged to the client.

6. A computer program product for transferring protected content, the computer program product comprising:
a storage medium readable by a processing circuit and storing instructions for execution by the processing circuit programmed to perform a method comprising:
performing with a computer processor the following:
packaging, by a DRM system residing at a server that is remote from a client, a content set within a file that is protected based on a given DRM format, wherein the given DRM format comprises a type of encoding and encrypting, and wherein the given DRM format is associated with a proprietary client application for rendering the content set;
identifying, by the DRM system, a set of rights to be granted to the client with respect to the content set;
determining, by the DRM system, that the client supports a DRM license format that is
  independent of the given DRM format used to package the content set, and
  independent of at least one DRM license format specific to the given DRM format and that is used to access the content set;
generating, by the DRM system, in response to the determining, a license in the DRM license format that is
  independent of the given DRM format used to package the content set, and
  independent of the at least one DRM license format specific to the given DRM format and that is used to access the content set, wherein the license includes information for allowing the client to gain access to the content set; and
transmitting, by the DRM system, the content set that has been packaged and the license to the client, wherein the information within the license is programmed to perform with a processor on the client the rendering of the content set on the client, and wherein the client fails to have a DRM client that is specific to the given DRM format used to package the content set.

7. The computer readable storage medium of claim 6, wherein the content set that has been packaged and the license are separate and distinct from each other.

* * * * *